United States Patent
Nishikubo

(10) Patent No.: US 9,053,007 B2
(45) Date of Patent: Jun. 9, 2015

(54) MEMORY SYSTEM, CONTROLLER, AND METHOD FOR CONTROLLING MEMORY SYSTEM

(75) Inventor: Ryuji Nishikubo, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 918 days.

(21) Appl. No.: 13/242,482

(22) Filed: Sep. 23, 2011

(65) Prior Publication Data

US 2012/0254514 A1 Oct. 4, 2012

(30) Foreign Application Priority Data

Mar. 28, 2011 (JP) .................. 2011-070852

(51) Int. Cl.
- G06F 13/00 (2006.01)
- G06F 13/28 (2006.01)
- G06F 12/02 (2006.01)

(52) U.S. Cl.
CPC .... G06F 12/0246 (2013.01); *G06F 2212/7201* (2013.01)

(58) Field of Classification Search
CPC ............ G06F 12/0246; G06F 2212/7201
USPC ........................................ 711/103
See application file for complete search history.

(56) References Cited

U.S. PATENT DOCUMENTS

| | | | |
|---|---|---|---|
| 7,979,663 B2 * | 7/2011 | Tomonaga | 711/170 |
| 2007/0113029 A1 | 5/2007 | Bennett et al. | |
| 2008/0140910 A1 * | 6/2008 | Flynn et al. | 711/100 |
| 2009/0319732 A1 * | 12/2009 | Boettcher et al. | 711/156 |
| 2010/0205354 A1 | 8/2010 | Suzuki | |
| 2011/0161560 A1 * | 6/2011 | Hutchison et al. | 711/103 |
| 2012/0144097 A1 | 6/2012 | Hashimoto | |
| 2012/0221776 A1 | 8/2012 | Yoshihashi et al. | |

FOREIGN PATENT DOCUMENTS

| | | |
|---|---|---|
| JP | 11-143764 A | 5/1999 |
| JP | 2003-337668 A | 11/2003 |
| JP | 2007-140733 | 6/2007 |
| JP | 2009-237668 A | 10/2009 |
| JP | 2010-512586 A | 4/2010 |
| JP | 2010-218290 | 9/2010 |
| WO | WO 2008/070811 A2 | 6/2008 |
| WO | WO 2008/070811 A3 | 6/2008 |
| WO | WO 2010/111694 | 9/2010 |

OTHER PUBLICATIONS

U.S. Appl. No. 13/420,808, filed Mar. 15, 2012, Hashimoto.

(Continued)

*Primary Examiner* — Edward Dudek, Jr.
(74) *Attorney, Agent, or Firm* — Oblon, McClelland, Maier & Neustadt, L.L.P.

(57) ABSTRACT

According to one embodiment, a memory system includes nonvolatile memory and storage unit storing a translation table indicating, by a predetermined management unit, relationships between logical addresses specified by a host and physical addresses in the nonvolatile memory. A memory system of the embodiment includes a controller that when receiving from the host a delete notification indicating a delete area smaller than the management unit specified by a logical address, write a specified data pattern to an area of the nonvolatile memory having a physical address corresponding to the delete area.

20 Claims, 8 Drawing Sheets

(56) References Cited

OTHER PUBLICATIONS

Office Action issued on Feb. 12, 2014 in the corresponding Japanese Patent Application No. 2011-070852 (with English Translation).

Office Action issued on Jun. 4, 2013 in the corresponding Japanese Patent Application Number: 2011-070852 (with English Translation).

Japanese Office Action dated Apr. 10, 2015, issued in Japanese Patent Application No. 2014-140953 (with English translation).

* cited by examiner

FIG.3

| LOGICAL ADDRESS (LBA) | PHYSICAL ADDRESS (E.G. PHYSICAL BLOCK NUMBER PHYSICAL PAGE NUMBER) |
|---|---|
| ............ | ............ |
| ............ | XXXXX (INVALID VALUE) |
| ............ | ............ |
| ............ | ............ |
| ............ | ............ |
| ⋮ | ⋮ |
| ............ | XXXXX (INVALID VALUE) |

MANAGEMENT UNIT (first row)

"ALREADY ALLOCATED" (rows 1–4)

"UNALLOCATED" (rows 5 and last)

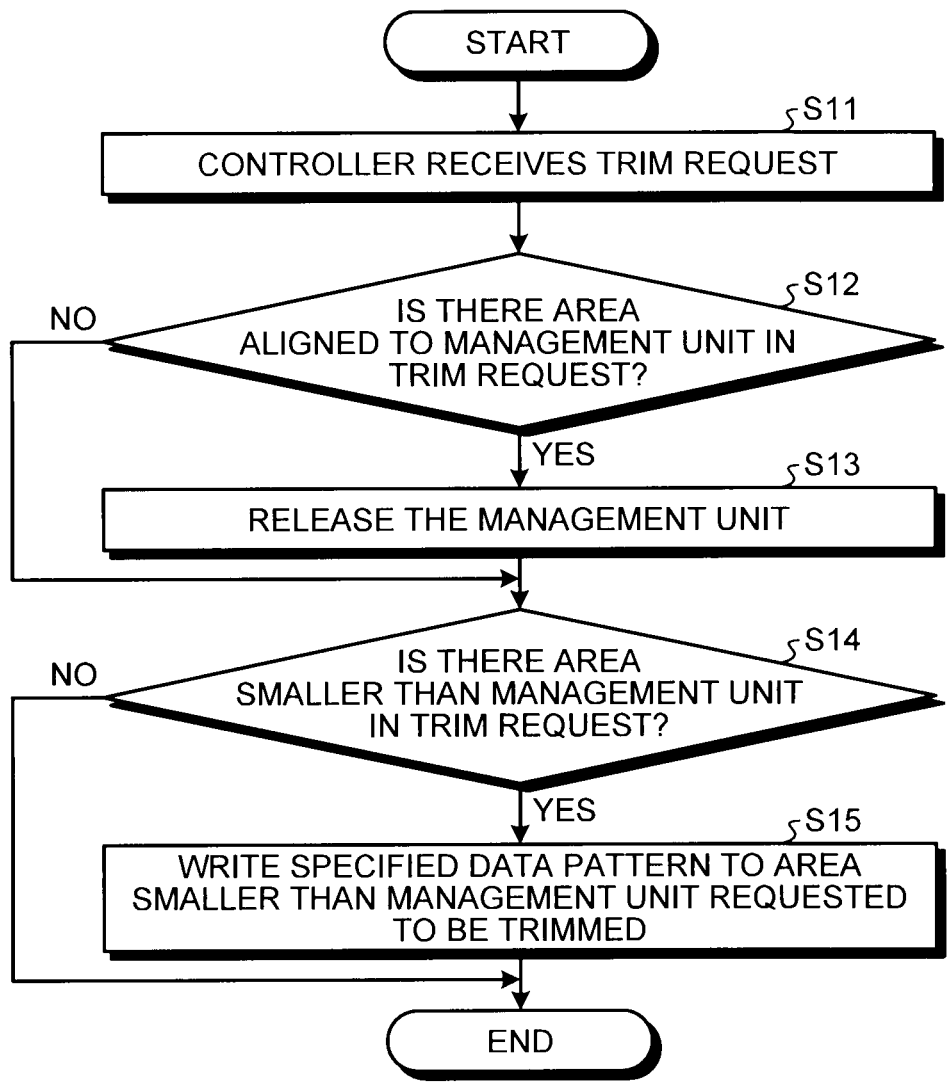

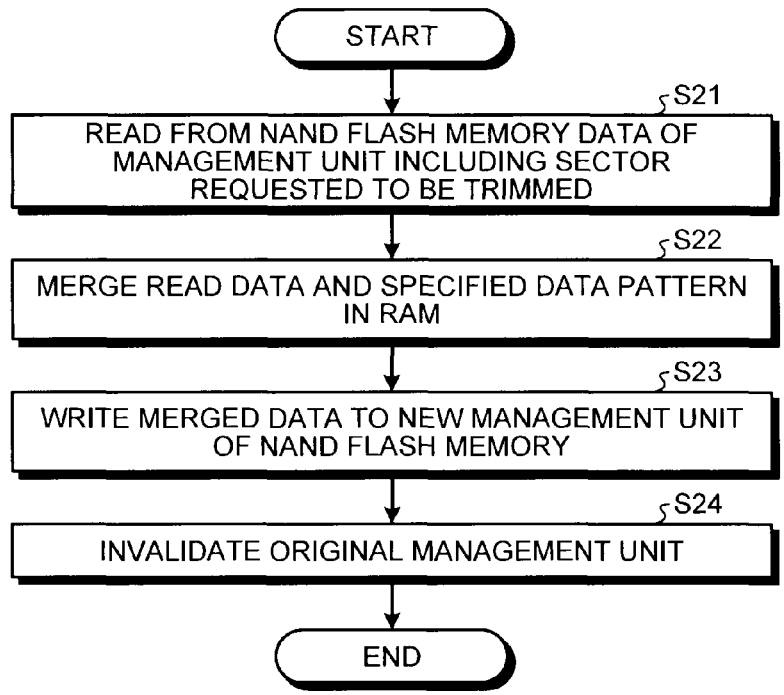
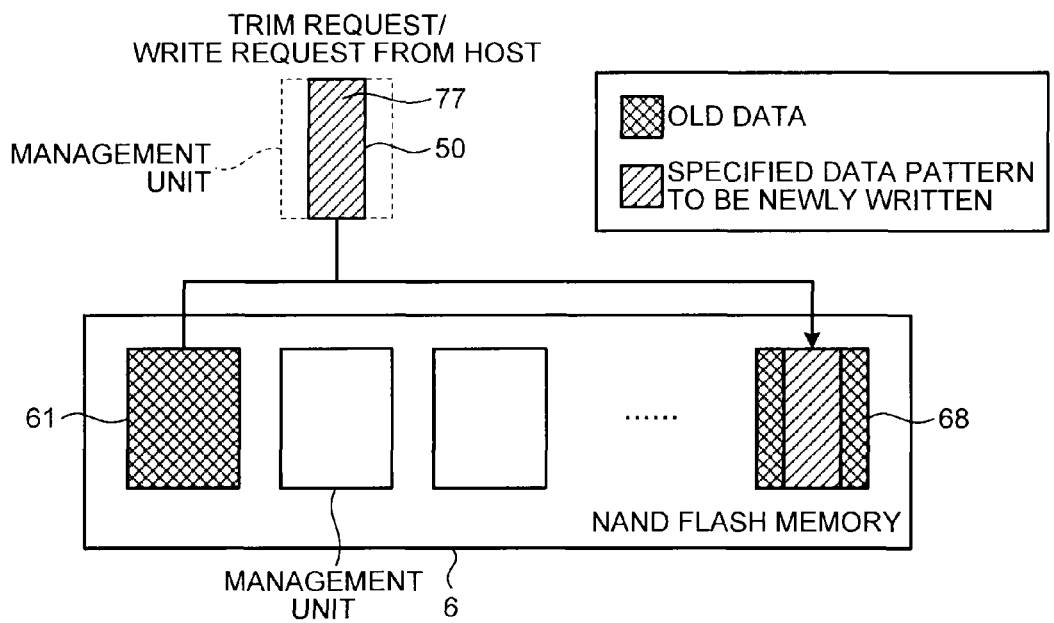

ND METHOD FOR CONTROLLING MEMORY SYSTEM

MEMORY SYSTEM, CONTROLLER, AND METHOD FOR CONTROLLING MEMORY SYSTEM

CROSS-REFERENCE TO RELATED APPLICATIONS

This application is based upon and claims the benefit of priority from Japanese Patent Application No. 2011-070852, filed on Mar. 28, 2011; the entire contents of which are incorporated herein by reference.

FIELD

Embodiments described herein relate generally to a memory system, a controller, and a method for controlling a memory system.

BACKGROUND

In a memory system as a secondary storage device, the reading and writing of data is instructed by a host on a sector unit basis. However, data written by the host is normally stored in nonvolatile semiconductor memory inside the memory system in specified management units having a larger size than the sector. The memory system holds a translation table being a correspondence table between an LBA (Logical Block Address) as a logical address and a location in the nonvolatile semiconductor memory in order to manage where each sector is stored in the nonvolatile semiconductor memory on a management unit basis.

BRIEF DESCRIPTION OF THE DRAWINGS

FIG. 3 is a view illustrating a translation table in the embodiment;

FIG. 4 is a flowchart illustrating the processing of the memory system of when receiving a trim request in the embodiment;

FIG. 5 is a flowchart illustrating the processing of writing a specified data pattern to an area corresponding to an LBA requested to be trimmed in the embodiment;

FIG. 6 is a conceptual diagram illustrating the processing of writing the specified data pattern to the area corresponding to the LBA requested to be trimmed in the embodiment;

DETAILED DESCRIPTION

In general, according to one embodiment, a memory system includes nonvolatile memory and storage unit storing a translation table indicating, by a predetermined management unit, relationships between logical addresses specified by a host and physical addresses in the nonvolatile memory on a management unit basis. The memory system according to the embodiment includes a controller writing a specified data pattern to an area of the nonvolatile memory having a physical address corresponding to a delete area when receiving from the host a delete notification indicating the delete area smaller than the management unit specified by a logical address.

With regard to all sectors in a management unit, when data is never written, a location in the nonvolatile semiconductor memory corresponding to a logical address of the management unit is "unallocated." When data is written by the host to a sector included in the unallocated management unit, the management unit including the relevant logical address becomes "already allocated," and the location in the nonvolatile semiconductor memory where the actual data exists is stored as a physical address. The memory system may move data in the nonvolatile semiconductor memory for the purposes such as the defragmentation of data. A notification of a data area that has become unnecessary is received from the host, and the "already allocated" management unit is returned to "unallocated"; accordingly, it is possible to reduce moves of unnecessary data.

In a conventional memory system, it is possible to receive from the host a notification of areas that have become unnecessary, for example, a notification by a DATA SET MANAGEMENT command adopted in INCITS ATA8-ACS (hereinafter called a trim request), by unit of sectors, change a management unit of an area aligned to a management unit (an area of the same size as a management unit) among the areas notified by the trim request from "already allocated" to "unallocated", and avoid the move of unnecessary data. On the other hand, an area that is not aligned to a management unit in the trim request, that is, an area smaller than a management unit that is requested to be trimmed, cannot be set to "unallocated," and cannot use information of the trim request.

If a flag showing whether an area is unnecessary by unit of sectors is introduced separately, when an unnecessary area of a management unit comes into existence, it is possible to set the area to unallocated in combination with information of a subsequent trim request. However, in this case, an additional storage area for storing information on a flag becomes necessary, and special processing for writing a flag is required.

Exemplary embodiments of a memory system and a method for controlling a memory system will be explained below in detail with reference to the accompanying drawings. The present invention is not limited to the following embodiments.

First Embodiment

Figure 1:
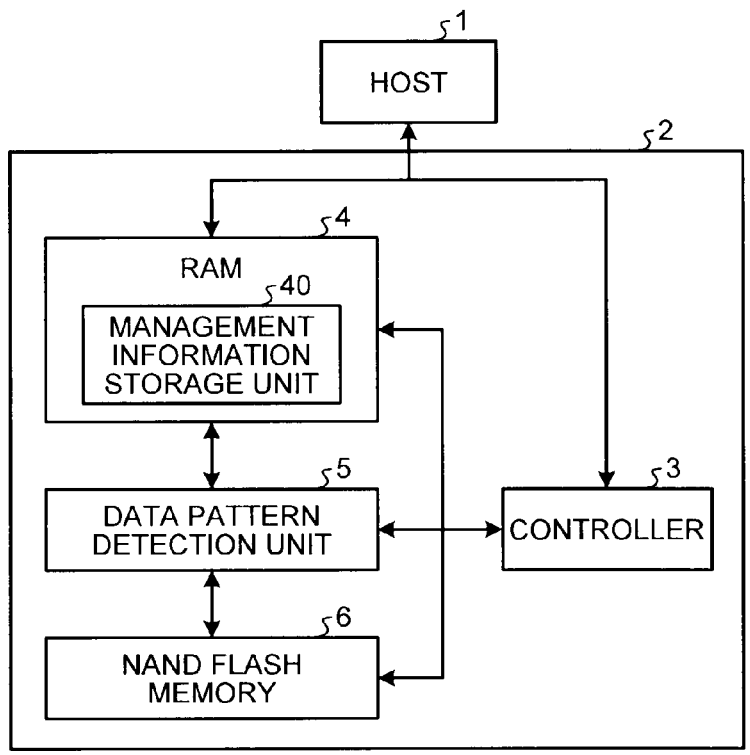
FIG. 1 is a block diagram illustrating a system configuration of a memory system (SSD) according to an embodiment.

FIG. 1 is a block diagram illustrating an example of a configuration of an SSD (Solid State Drive) 2 as a memory system according to an embodiment. The SSD 2 being a semiconductor memory device includes RAM 4 having a management information storage unit 40, a data pattern detection unit 5 described below, NAND flash memory 6 actually storing data, and a controller 3 controlling them. The SSD 2 receives a read and a write instruction from a host 1 via an unillustrated interface. The interface between the host 1 and the SSD 2 is pursuant to the SATA (Serial ATA) standard, for example, but is not limited to this. The data pattern detection unit 5 may be implemented as hardware, and may be implemented as a firmware module executed by the controller 3.

The NAND flash memory 6 has a memory cell array where a plurality of nonvolatile memory cells are placed on a matrix, and a peripheral circuit for controlling write, read and erase operations on the memory cell array. The memory cell array is configured by arranging a plurality of blocks being a minimum unit of data erasure. Each block is configured by arranging a plurality of pages being a minimum unit of data write and read. A storage capacity of a block is, for example, 1024 KB, and a storage capacity of a page is, for example, 8 KB. Each memory cell may be configured to store a bit, and may be configured to store two bits or more. In the NAND flash memory 6, a rewrite to the same page in a block is permitted only after an entire block including the page is erased once.

An attribute called trim is defined in the DATA SET MANAGEMENT command of the ATA standard being a standard for exchanging data between a host and a memory system. This makes it possible for the host to notify the memory system of an area that has become unnecessary by unit of sectors. With regard to this, the ATA commands standard shall be referred to (http://www.t13.org/Documents/Uploaded-Documents/docs2009/d2015r1a-ATAATAPI_Command_Set_-_2_ACS-2.pdf), and the detailed description will not be given herein. Such a command is hereinafter called a trim command (trim request). According to this command, a storage area that has become unnecessary is specified by a start logical address (LBA) and a sector size. The embodiment can be applied not only to a trim request of the ATA standard, but also to a command having a similar specification even if of a standard other than the ATA standard.

The description will be continued, returning to FIG. 1. Data written by the host 1 is stored in the NAND flash memory 6 on a specified management unit basis. Assuming contiguous addresses in a logical address space as a unit of logical-physical conversion (conversion between a logical address and a physical address), all the contiguous addresses are allocated to a physical area in the NAND flash memory 6 together. This management unit is larger than a sector unit specified by the above-mentioned trim request, and a plurality of sectors whose logical addresses are contiguous is placed in order in the management unit. Although the size of a management unit is arbitrary, it is possible to cause any one of, for example, a page size and a block size of the NAND flash memory 6 and a cluster size of a file system adopted by the host 1 to agree.

If update data written by the host 1 is not aligned to a management unit, data already stored in an area of the size of a management unit in the NAND flash memory 6 and the newly written update data smaller than the size of a management unit are merged in the RAM 4. Data is created on a management unit basis, and then is written to free space of the NAND flash memory 6 (read-modify-write). Where the data written by the host 1 is written in the NAND flash memory 6 is changed dynamically, and a corresponding relationship thereof is managed by the translation table described later. As a logical address, an LBA (Logical Block Address) where a serial number starting from 0 is attached to logical capacity by unit of sectors is adopted, for example. The sector size is 512 B, for example.

Figure 2:
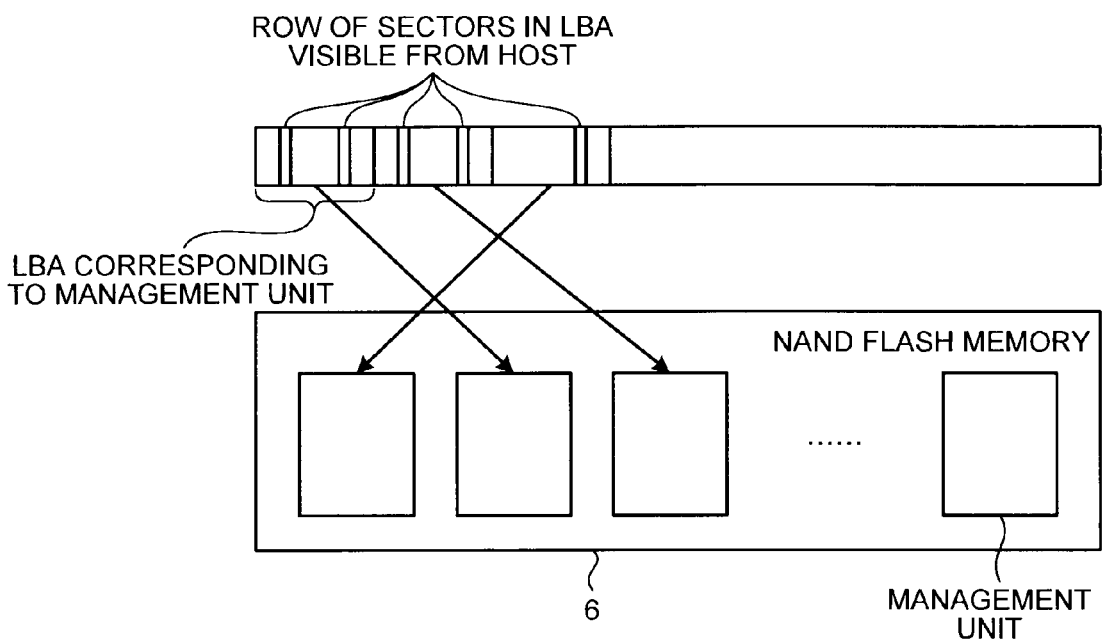
FIG. 2 is a view illustrating corresponding relationships between LBAs aligned to management units and data areas allocated to the management units on NAND flash memory in the embodiment.

FIG. 2 is a view illustrating corresponding relationships between LBAs aligned to management units and data areas allocated to management units in the NAND flash memory. As in FIG. 2, although an LBA specified by the host 1 at the write request is by unit of sectors, the LBA is aligned to the size of a management unit (a page size, for example) in the SSD 2, and sectors corresponding to contiguous LBAs in the management unit are stored all together in an area of the management unit of the NAND flash memory 6. For example, if the size of a management unit is equal to a page size, a plurality of sectors corresponding to LBAs aligned to the size of a page are written into an area equivalent to the page size of the NAND flash memory 6.

FIG. 3 is a view illustrating a translation table in the embodiment. The management information storage unit 40 stores a translation table showing a corresponding relationship of where data specified by an LBA is written in the NAND flash memory 6. The translation table of FIG. 3 includes values where LBAs specified by the host 1 are aligned to management units as logical addresses and values where physical addresses of the NAND flash memory 6 are aligned to management units as physical addresses. For example, if a management unit is equal to a page size, a physical page number is registered as a physical address. In addition, for example, if a management unit is equal to a block size, a physical block number is registered as a physical address.

If data is never written by the host 1, an LBA aligned to a management unit is set to an "unallocated" state by things such as writing an invalid value to the location of a physical address corresponding to the LBA in the translation table. If data is written to a sector in a management unit, the management unit turns to "already allocated," and the location in the NAND flash memory 6 is recorded in the translation table. The SSD 2 may move data of management units that have turned to "already allocated" for the purposes such as the defragmentation of data. A notification of an area that has become unnecessary is received from the host 1, the management unit that is no longer used is set to "unallocated"; accordingly, it is possible to reduce moves of unnecessary data.

FIG. 4 is a flowchart illustrating the processing of the memory system of when receiving a trim request. The controller 3 receives a trim request from the host 1 (Step S11). As described above, a trim request includes a start LBA of a trim target area and a sector size. Incidentally, a trim request may set a plurality of trim target areas.

The controller 3 determines whether or not the LBA range specified as the trim target area includes the whole area of at least one management unit. If a plurality of areas of management units is included, a process of the following Step 13 is applied to all of them (Step S12). If an area of a management unit is included (Step S12: Yes), the controller 3 operates the translation table, changes an LBA of the management unit to "unallocated," and releases the area allocated to the LBA of the management unit in the NAND flash memory 6 (Step S13).

The controller 3 determines whether or not the LBA range specified as a trim target area includes an area smaller than a management unit (Step S14). If a trim target area smaller than a management unit exists (Step S14: Yes), the controller 3 writes a "specified data pattern" into the trim target area smaller than the management unit (Step S15). In the embodiment, that the "specified data pattern" has been written is used as a flag indicating that the area is unnecessary.

Here, a detailed description will be given of the process of the above Step S15. Incidentally, the process described here is not limited to the case where the "specified data pattern" is written by a trim request, and even if normal data is written by the host 1 of FIG. 1, a write to the NAND flash memory 6 is performed by the similar process.

When the SSD 2 writes data to the NAND flash memory 6, there are limitations such as the following. The controller 3 can only manage data in the resolution of the translation table, in other words, in specified management units larger than a sector unit. In other words, it is not possible to write data to dispersed locations by unit of sectors. Moreover, the NAND flash memory 6 cannot overwrite data. A detailed description will be given of the processing procedure (read-modify-write) of Step S15 of writing data smaller than a management unit (the data being not aligned to a management unit) under these limitations, with reference to the flowcharts of FIG. 5, and a conceptual diagram illustrated in FIG. 6.

FIG. 5 is a flowchart illustrating the processing of writing a specified data pattern to an area corresponding to an LBA requested to be trimmed. Furthermore, FIG. 6 is a conceptual diagram illustrating the processing of writing the specified data pattern to the area corresponding to the LBA requested to be trimmed. If there is a trim request to an area 50 smaller than a management unit from the host 1, the controller 3 reads data of an entire management unit 61 including a sector requested to be trimmed from the NAND flash memory 6, and holds the data in the RAM 4 (Step S21 in FIG. 5). The management unit 61 represents an area in the NAND flash memory 6, where an LBA requested to be trimmed is associated with a value aligned to a management unit in the translation table, and stores data written by the host 1 before.

The controller 3 overwrites a "specified data pattern" 77 on an area requested to trim the data read from the management unit 61 in the RAM 4 and accordingly merges data written into the management unit 61 in areas other than the trim target area and the "specified data pattern" 77 (Step S22). In general, the merge operation here applies similarly to a case of overwriting update data written by the host 1 on the data written into the management unit 61, too. Here, for a trim request that does not meet the size of the management unit 61, the "specified data pattern" 77 is overwritten on a sector in a range requested to be trimmed in the data written into the management unit 61.

The controller 3 writes new data merged in the RAM 4 in this manner to the free space (an already erased new management unit 68) of the NAND flash memory 6 (Step S23). The controller 3 operates the translation table of FIG. 3, and records a physical address corresponding to the management unit 68 for the LBA aligned to a management unit including the trim target area. The management unit 61 where the old data written by the host 1 before is stored is released from the association with the LBA to be invalidated, and is handled as free space after data erasure (Step S24).

Figure 7:
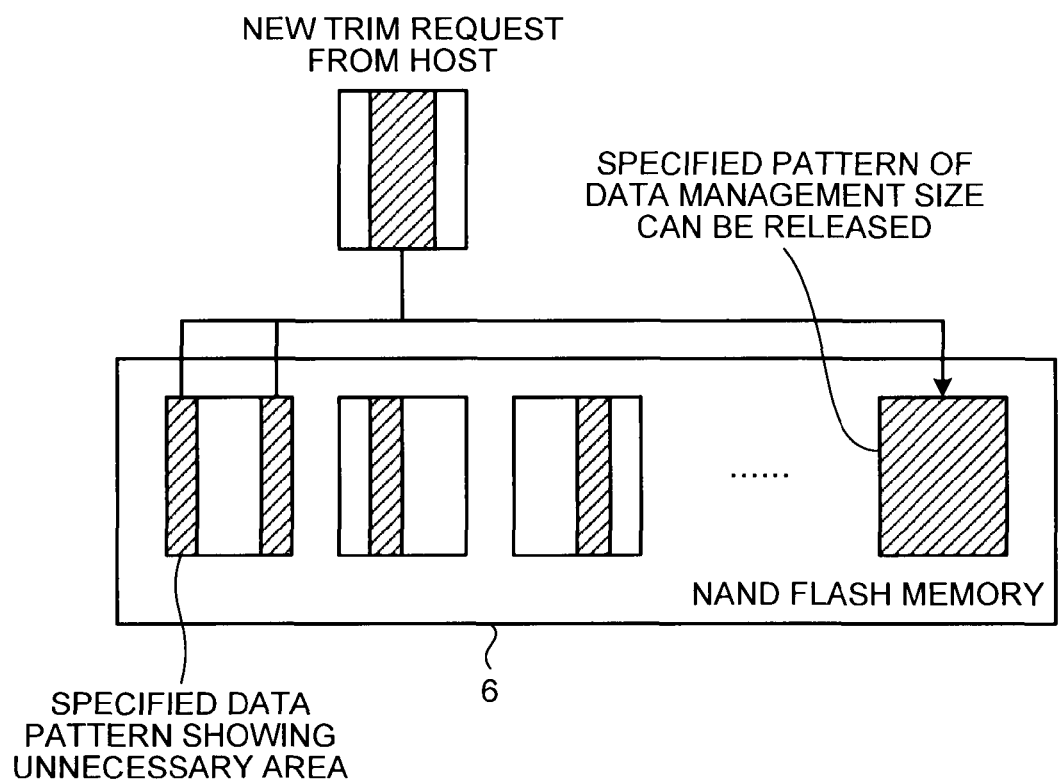
FIG. 7 is a conceptual diagram illustrating that a management unit can be released if the whole management unit has turned to the specified data pattern in the embodiment.

FIG. 7 is a conceptual diagram illustrating that a management unit can be released if the whole management unit has turned to the specified data pattern. As described above, the "specified data pattern" 77 corresponding to the trim target area is merged with data of a management unit in the NAND flash memory 6 and is written to the NAND flash memory 6, similarly to a normal write by the host 1. As illustrated in FIG. 7, if all sectors in the management unit have turned to the "specified data pattern" as a result of the merge, the controller 3 can change a logical address of the management unit to "unallocated" and release the management unit.

Figure 8:
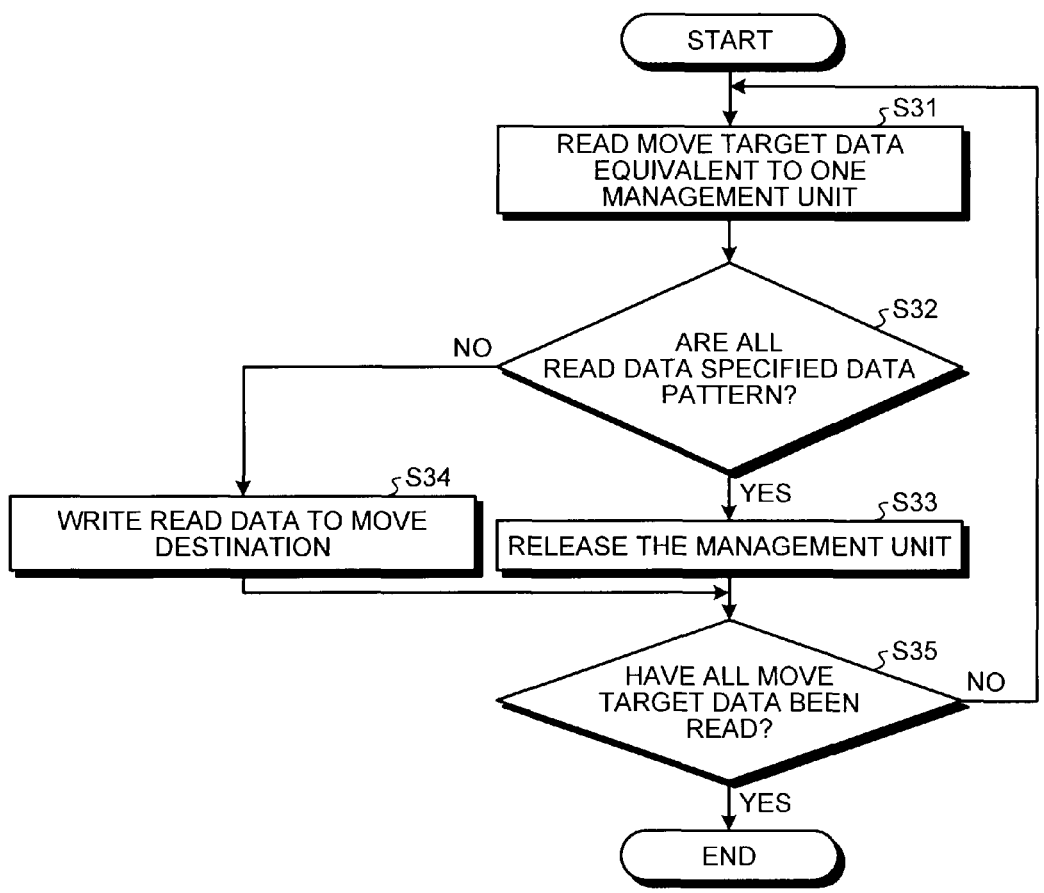
FIG. 8 is a flowchart illustrating the processing of releasing a releasable management unit when data of a management unit is moved in the embodiment.

FIG. 8 is a flowchart illustrating the processing of releasing an area of a releasable management unit when data of a management unit is moved. In cases such as where the controller 3 moves data in the NAND flash memory 6, when data equivalent to a management unit is read from the data targeted for the move (Step S31), the data pattern detection unit 5 determines whether or not the "specified data pattern" has been written to all the sectors in the management unit (Step S32).

For example, if the amount of invalidated old data increases and an area to which new data can be written is reduced, a data move is performed when collecting data of a management unit stored in an "already allocated" area in a specific block and erasing the block with old data only to increase free space (called compaction or garbage collection). Also when data is degraded after a lapse of a long time since a write is performed to a memory cell, the data move is performed to improve reliability by rewriting data to another free space (called refresh).

If detecting that all the sectors in the management unit have turned to the "specified data pattern" (Step S32: Yes), the data pattern detection unit 5 notifies the controller 3 to that effect. After receiving the notification from the data pattern detection unit 5, the controller 3 changes the management unit to "unallocated" to release an area allocated to an LBA of the management unit in the NAND flash memory 6 (Step S33).

If not all the sectors in the management unit have turned to the "specified data pattern" (Step S32: No), the data pattern detection unit 5 notifies the controller 3 to that effect. After receiving the notification from the data pattern detection unit 5, the controller 3 writes the read data as it is to a move destination in the NAND flash memory 6 (Step S34).

After Steps S33 and S34, the controller 3 determines whether or not all data targeted for the move have been read (Step S35). If not all the data have been read (Step S35: No), return to Step S31. If all the data targeted for the move have been read (Step S35: Yes), the data move processing is terminated.

Moreover, if the memory system of the embodiment executes the above operation, it is preferable that the memory system should further execute the following operation in order to function smoothly as a memory system. In other words, also in a case where the "specified data pattern" is written to the NAND flash memory 6 not as a trim request of the host 1, it is intended to prevent inconsistency in data from being produced.

Specifically, if the host 1 made a read request to an "unallocated" LBA where an invalid value is written to a location of a physical address in the translation table of FIG. 3, the "specified data pattern" is returned to the host 1. Accordingly, the SSD 2 being a semiconductor memory device does not need to distinguish a case where the "specified data pattern" is written by the trim request and the case where a write request of the "specified data pattern" actually comes from the host 1.

Therefore, if the "specified data pattern" of a size aligned to a management unit is written by the host 1, not by a trim request, a contradiction does not arise even if the management unit is released in Step S33 in accordance with the flow of FIG. 8. This is because if there is a read request to an LBA corresponding to the released area, although the real data have been invalidated and do not exist, it is possible to ensure write data by returning the "specified data pattern."

As described above, the memory system according to the embodiment receives a trim request from the host, and then immediately releases an area aligned to a data management unit of the memory system among areas that have become unnecessary after requested to be trimmed. If an area that has become unnecessary is not aligned to a data management unit, information that the area is unnecessary is held by writing the "specified data pattern" to the area that has become unnecessary. When a releasable area where the whole management unit is the "specified data pattern" is made afterward in combination with a subsequent trim request, the area is released. In other words, if the "specified data pattern" aligned to a data management unit is detected afterward upon reading data, the area is released. Accordingly, it is possible to make the most of information of a trim request.

Furthermore, the embodiment makes it possible to increase an area that the memory system can use by deeming a management unit where the "specified data pattern" is written unnecessary and releasing the management unit. There is no particular need to distinguish the case where the host accidentally writes the "specified data pattern" and the case where the controller writes after receipt of a trim request. The "specified data pattern" is used as a flag of a trim target area. Therefore, an additional storage area that stores a flag indicating whether or not each sector is unnecessary is not required.

Moreover, information on an area that is not aligned to a management unit, the information being conventionally abandoned or stored by adding a storage area, in a trim request is stored without a need for an additional storage area, and all the information of a trim request can comes into use. A plurality of trim requests that are not aligned to management units is combined to release a management unit; accordingly, it is possible to increase a usable area of nonvolatile semiconductor memory.

Incidentally, although the description has been given, assuming that there is one type of management unit larger than a sector in the embodiment, if there are a plurality of types of management units larger than a sector such as a cluster (twice or larger natural number times as large as a sector, for example) and a track (twice or larger natural number times as large as a cluster, for example), in cases such as of performing defragmentation from a small management unit into a large management unit, the above-mentioned invalidation process may be executed at that time. Specifically, if an entire lower management unit configuring an upper management unit has turned to the "specified data pattern," things such as releasing the upper management unit can be considered.

Furthermore, although the description has been given, taking, for example, a trim command as a command to write the "specified data pattern" in the embodiment, it is not limited to this. For example, if information indicating the location of a bad sector is sent from the host, the "specified data pattern" may be written to an LBA corresponding to the bad sector.

Second Embodiment

Figure 9:
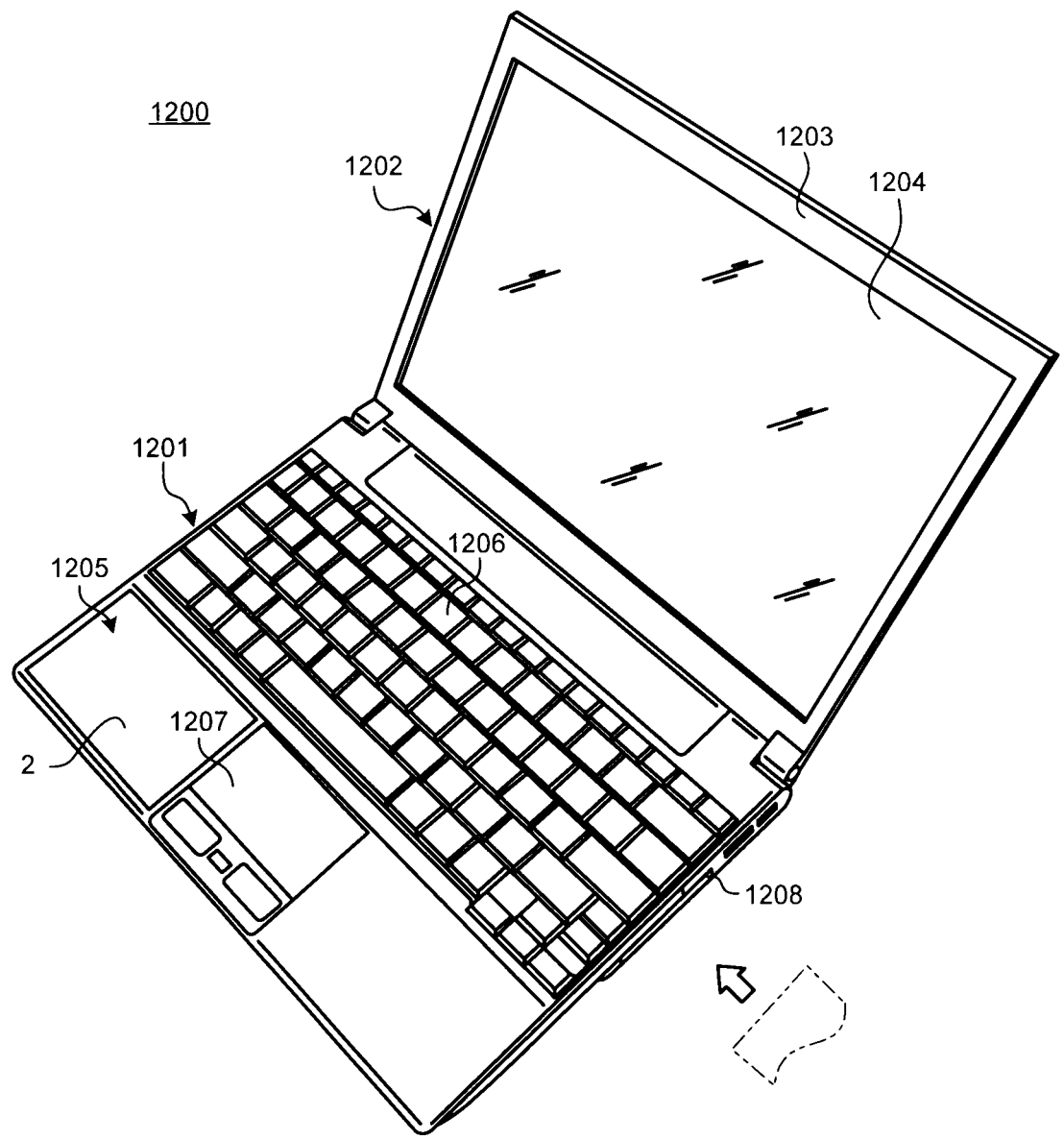
FIG. 9 is a perspective view illustrating an external appearance of a personal computer.

FIG. 9 is a perspective view illustrating an example of a personal computer 1200 equipped with the SSD 2. The personal computer 1200 includes a main body 1201 and a display unit 1202. The display unit 1202 has a display housing 1203 and a display device 1204 housed in the display housing 1203.

The main body 1201 has a casing 1205, a keyboard 1206, and a touchpad 1207 being a pointing device. A main circuit board, an ODD (Optical Disk Device) unit, a card slot, the SSD 2, and the like are housed in the casing 1205.

The card slot is provided adjacently to a surrounding wall of the casing 1205. The surrounding wall is provided with an opening 1208 opposing the card slot. A user can insert and remove an additional device in and from the card slot from the outside of the casing 1205 through the opening 1208.

The SSD 2 is assumed to be a replacement of a conventional HDD, and may be used in a state of being implemented in the personal computer 1200, and may be used as an additional device in a state of being inserted in the card slot provided for the personal computer 1200.

Figure 10:
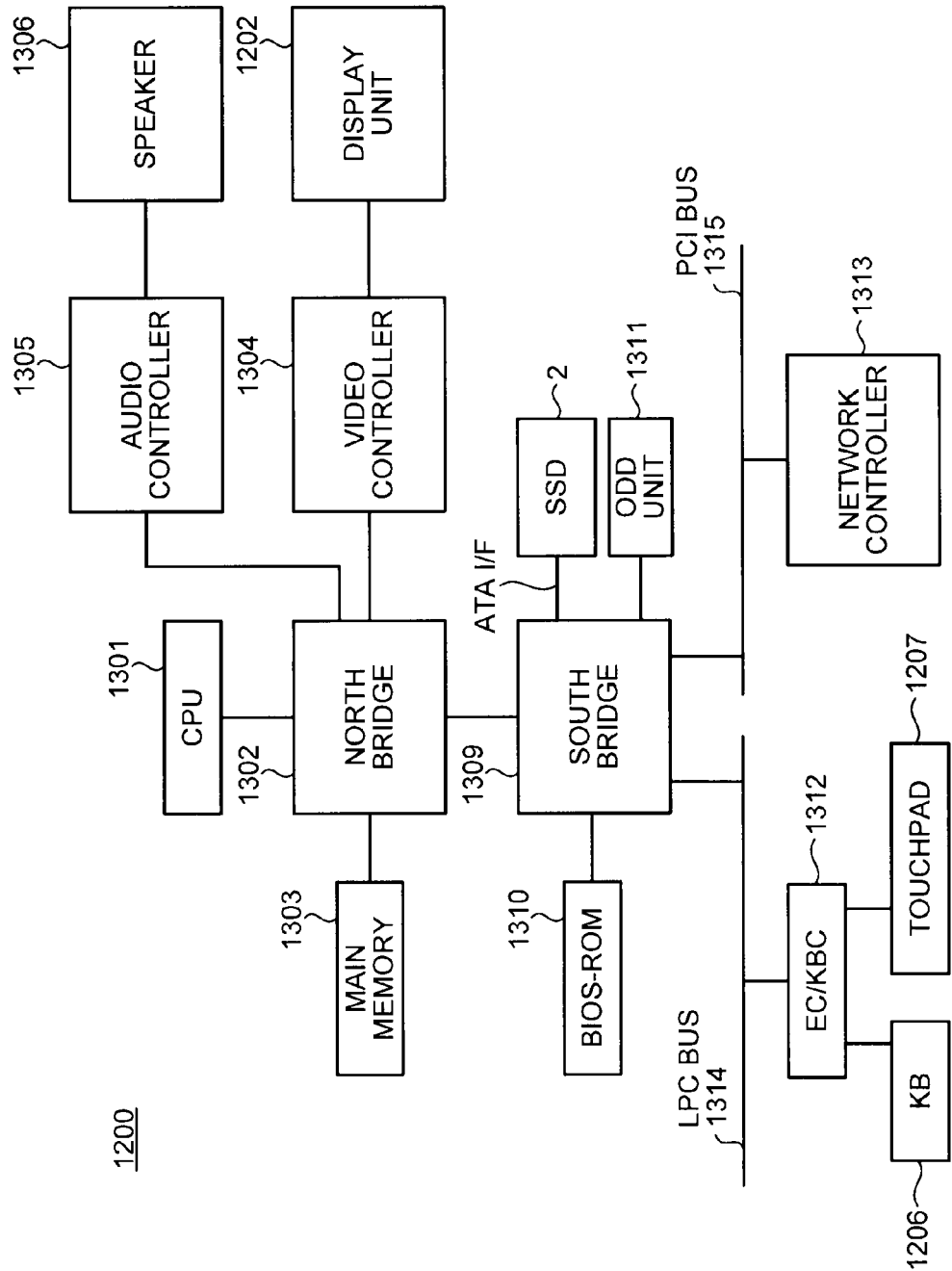
FIG. 10 is a view illustrating an example of a function configuration of the personal computer.

FIG. 10 is a view illustrating an example of a system configuration of the personal computer equipped with the SSD 2. The personal computer 1200 includes a CPU 1301, a north bridge 1302, main memory 1303, a video controller 1304, an audio controller 1305, a south bridge 1309, BIOS-ROM 1310, the SSD 2, an ODD unit 1311, an embedded controller/keyboard controller IC (EC/KBC) 1312, a network controller 1313, and the like.

The CPU 1301 is a processor provided to control the operation of the personal computer 1200, and executes an operating system (OS) loaded from the SSD 2 into the main memory 1303. Furthermore, if the ODD unit 1311 enables at least one of a read and a write process from and to a loaded optical disk, the CPU 1301 executes these processes.

Moreover, the CPU 1301 executes a system BIOS (Basic Input Output System) stored in the BIOS-ROM 1310, too. Incidentally, the system BIOS is a program for controlling hardware in the personal computer 1200.

The north bridge 1302 is a bridge device connecting between a local bus of the CPU 1301 and the south bridge 1309. A memory controller controlling access to the main memory 1303, too, is embedded in the north bridge 1302.

Furthermore, the north bridge 1302 has a function of executing communications with the video controller 1304 and communications with the audio controller 1305 via an AGP (Accelerated Graphics Port) bus and the like.

The main memory 1303 stores programs and data temporarily and functions as a work area of the CPU 1301. The main memory 1303 is configured of RAM, for example.

The video controller 1304 is a video playback controller controlling the display unit 1202 used as a display monitor of the personal computer 1200.

The audio controller 1305 is an audio playback controller controlling a speaker 1306 of the personal computer 1200.

The south bridge 1309 controls each device on an LPC (Low Pin Count) bus 1314 and each device on a PCI (Peripheral Component Interconnect) bus 1315. Moreover, the south bridge 1309 controls the SSD 2 being a storage device that stores each type of software and data via an ATA interface.

The personal computer 1200 accesses the SSD 2 by unit of sectors. A write command, a read command, a cache flush command, and the like are input to the SSD 2 via the ATA interface.

Furthermore, the south bridge 1309 has a function of controlling access to the BIOS-ROM 1310 and the ODD unit 1311, too.

The EC/KBC 1312 is a one-chip microcomputer integrating an embedded controller for power management and a keyboard controller for controlling the keyboard (KB) 1206 and the touchpad 1207.

The EC/KBC 1312 has a function of switching on/off the power of the personal computer 1200 in accordance with the operation of a power button by a user. The network controller 1313 is a communication device executing communications with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory;
a storage unit storing a translation table indicating, by a first management unit, relationships between logical addresses specified by a host and physical addresses in the nonvolatile memory; and
a controller, when receiving, from the host, a delete notification indicating a delete area specified by a logical address, the delete area being smaller than the first management unit, configured to:

read first data from a first area in the first management unit of the nonvolatile memory, the first data including second data and third data, the second data having a physical address corresponding to the delete area, the third data having a physical address not corresponding to the delete area;

merge a specified data pattern and the third data; and write the merged data to a second area in the first management unit of the nonvolatile memory.

2. The memory system according to claim 1, wherein, when receiving the delete notification, the controller writes an invalid value to a physical address corresponding in the translation table to the first area and releases the first area.

3. The memory system according to claim 1, further comprising:

a detection unit detecting the specified data pattern in data read from the nonvolatile memory, wherein the controller is configured to, based on a detection result by the detection unit, in a case where a releasable first management unit exists in the data read from the nonvolatile memory, all of an area in the releasable first management unit including the specified data pattern, write an invalid value to a physical address corresponding in the translation table to the area of the releasable first management unit and release an area of a logical address of the releasable first management unit.

4. The memory system according to claim 2, further comprising:

a detection unit detecting the specified data pattern in data read from the nonvolatile memory, wherein the controller is configured to, based on a detection result by the detection unit, in a case where a releasable first management unit exists in the data read from the nonvolatile memory, all of an area in the releasable first management unit including the specified data pattern, write an invalid value to a physical address corresponding in the translation table to the area of the releasable first management unit and release an area of a logical address of the releasable first management unit.

5. The memory system according to claim 1, wherein the controller writes the specified data pattern to the nonvolatile memory when receiving a write request of the specified data pattern from the host, and returns to the host the specified data pattern as read data in a case where the host makes a read request to a logical address that an invalid value is written to a corresponding physical address in the translation table.

6. The memory system according to claim 3, wherein the detection unit detects the specified data pattern upon defragmenting a plurality of second management units larger than a sector into the first management unit, the first management unit being larger than the second management unit.

7. The memory system according to claim 1, wherein the first management unit is larger than a sector.

8. A memory controller configured to control a nonvolatile memory, the memory controller comprising:

a storage unit storing a translation table indicating, by a first management unit, relationships between logical addresses specified by a host and physical addresses in the nonvolatile memory; and a controller, when receiving, from the host, a delete notification indicating a delete area specified by a logical address, the delete area being smaller than the first management unit, configured to read first data from a first area in the first management unit of the nonvolatile memory, the first data including second data and third data, the second data having a physical address corresponding to the delete area, the third data having a physical address not corresponding to the delete area, merge a specified data pattern and the third data, and write the merged data to a second area in the first management unit of the nonvolatile memory.

9. The memory controller according to claim 8, wherein, when receiving the delete notification, the controller writes an invalid value to a physical address corresponding in the translation table to the first area and releases the first area.

10. The memory controller according to claim 8, wherein the controller is configured to detect the specified data pattern in data read from the nonvolatile memory, and in a case where a releasable first management unit exists in the data read from the nonvolatile memory, all of an area in the releasable first management unit including the specified data pattern, write an invalid value to a physical address corresponding in the translation table to the area of the releasable first management unit and release an area of a logical address of the releasable first management unit.

11. The memory controller according to claim 9, wherein the controller is configured to detect the specified data pattern in data read from the nonvolatile memory, and in a case where a releasable first management unit exists in the data read from the nonvolatile memory, all of an area in the releasable first management unit including the specified data pattern, write an invalid value to a physical address corresponding in the translation table to the area of the releasable first management unit and release an area of a logical address of the releasable first management unit.

12. The memory controller according to claim 8, wherein the controller is configured to write the specified data pattern to the nonvolatile memory when receiving a write request of the specified data pattern from the host, and return to the host the specified data pattern as read data when the host makes a read request to a logical address that an invalid value is written to a corresponding physical address in the translation table.

13. The memory controller according to claim 10, wherein the controller is configured to detect any one of presence and absence of the specified data pattern upon defragmenting a plurality of second management units larger than a sector into the first management unit, the first management unit being larger than the second management unit.

14. A method for controlling a nonvolatile memory, the method comprising:

managing a translation table indicating, by a first management unit, relationships between logical addresses specified by a host and physical addresses in the nonvolatile memory;

when receiving, from the host, a delete notification indicating a delete area smaller specified by a logical address, the delete area being smaller than the first management unit;

reading first data from a first area in the first management unit of the nonvolatile memory, the first data including second data and third data, the second data having a physical address corresponding to the delete area, the third data having a physical address not corresponding to the delete area;

merging a specified data pattern and the third data; and writing the merged data to a second area in the first management unit of the nonvolatile memory.

15. The method according to claim 14, further comprising:

when receiving the delete notification, writing an invalid value to a physical address corresponding in the translation table to the first area and releasing the first area.

16. The method according to claim 14, further comprising:

detecting the specified data pattern in data read from the nonvolatile memory;

in a case where a releasable first management unit exists in the data read from the nonvolatile memory, all of an area in the releasable first management unit including the specified data pattern, writing an invalid value to a physical address corresponding in the translation table to the area of the releasable first management unit and releasing an area of a logical address of the releasable first management unit.

17. The method according to claim 15, further comprising:

detecting the specified data pattern in data read from the nonvolatile memory;

in a case where a releasable first management unit exists in the data read from the nonvolatile memory, all of an area in the releasable first management unit including the specified data pattern, writing an invalid value to a physical address corresponding in the translation table to the area of the releasable first management unit and releasing an area of a logical address of the releasable first management unit.

18. The method according to claim 14, further comprising:

writing the specified data pattern to the nonvolatile memory when receiving a write request of the specified data pattern from the host; and returning to the host the specified data pattern as read data when the host makes a read request to a logical address that an invalid value is written to a corresponding physical address in the translation table.

19. The method according to claim 17, further comprising:

detecting any one of presence and absence of the specified data pattern upon defragmenting a plurality of second management units larger than a sector into the first management unit, the first management unit being larger than the second management unit.

20. The method according to claim 14, wherein the first management unit is larger than a sector.

* * * * *